Patented May 12, 1953

2,638,460

UNITED STATES PATENT OFFICE 2,638,460

BUTADIENE POLYMERS AS ELASTOMER ADDITIVES

Willie W. Crouch, Bartlesville, Okla., assignor to Phillips Petroleum Company, a corporation of Delaware No Drawing. Application January 2, 1951,
Serial No. 204,069

11 Claims. (Cl. 260—33.6)

This invention relates to elastomer compounding. In a more specific aspect this invention relates to new plasticizers and/or tackifiers for elastomers, synthetic and/or natural. In a still more specific aspect this invention relates to polybutadienes as softeners, plasticizers and/or tackifiers for synthetic and/or natural rubber.

Various types of materials have been employed as softeners, tackifiers and/or plasticizers for both natural and synthetic rubbers and it is known that variations in properties of rubber products can be produced through the use of different plasticizing agents. A good plasticizer, in addition to softening a rubber stock, must give a finished product with other desirable properties. Some materials which exert the desired plasticizing action often have deleterious effects on other properties to the extent that the finished products are of little value for many purposes. It has generally been recognized that high Mooney value elastomers are difficult to process and large amounts of softeners are usually required. The presence of sufficient plasticizing agent to provide desirable processing characteristics frequently results in detrimental effects on physical properties. Also, many synthetic elastomers do not possess sufficient tack to be used in carcass stocks.

I have now discovered that liquid butadiene polymers, prepared under carefully controlled mass polymerization conditions in the presence of an alkali metal and /or alkali metal hydride catalyst, serve as excellent rubber plasticizers. These plasticizers comprise liquid polymers prepared from conjugated diolefin hydrocarbons selected from the group consisting of 1,3-butadiene and 2-methyl-1,3-butadiene, or isoprene. The method for the preparation of these polymers is described in my copending application filed December 23, 1948, Serial No. 67,098, of which this case is a continuation-in-part. The new plasticizers, tackifiers or softeners used in the practice of my invention can very advantageously be used in carcasses wherein synthetic elastomers are used.

It is an object of this invention to provide new elastomer compounding methods and additives and elastomer mixes.

Another object of this invention is to provide new elastomer compounding additives and new elastomer products resulting from their use.

It is another object of this invention to provide new softeners, plasticizers and/or tackifiers for elastomers, synthetic and/or natural, and new elastomer products with improved properties resulting from the use of such softeners, plasticizers and/or tackifiers.

Other objects and advantages of this invention will become apparent, to one skilled in the art, upon reading this disclosure.

The term "rubber," as used in this disclosure, is intended to cover both natural and synthetic rubber. In its broadest aspect, my invention applies to providing softeners, plasticizers or tackifiers for vulcanizable organic elastomers containing unsaturated carbon to carbon bonds. My invention applies to softening, plasticizing or tackifying natural rubber or rubber-like polymers produced by the polymerization of aliphatic conjugated diolefins, particularly those having from 4 to 6 carbon atoms per molecule, such as butadiene, isoprene, pentadienes, etc., or the co-polymerization of such diolefins with a compound containing a $CH_2=C<$ group copolymerizable therewith, such as styrene, acrylonitrile, etc. The vulcanizable plasticizers used in the practice of my invention are very advantageously applied to the compounding of the relatively new low-temperature synthetic rubbers which are prepared by copolymerizing butadiene and styrene monomers in an emulsion system at a temperature of from $-20$ to $15°$ C., the butadiene monomer being present in an amount of from 50 to 85 weight per cent of the total weight of monomers charged. The softeners, plasticizers, or tackifiers of my invention can be used with butyl rubber stocks which are produced by co-polymerizing a major quantity of isobutylene, with a minor quantity of a conjugated diolefin, such as those mentioned hereinbefore. The softeners, plasticizers, or tackifiers of my invention can be used with reclaimed natural or synthetic rubbers and to various mixtures of natural, synthetic, reclaimed natural and reclaimed synthetic rubber.

The plasticizing or softening agents of this invention are applicable in compounding both natural and synthetic rubbers. Their powerful plasticizing action makes them particularly valuable for use in high Mooney value butadiene-styrene elastomers which are generally regarded as being difficult to process. When so used they produce rubbers which are not only readily processable, but which have good physical properties and are generally superior in aged flex life, abrasion resistance, and extrusion characteristics. Similar effects are also produced in the properties of lower Mooney butadiene-styrene elastomers. These plasticizing agents are also valuable for use in rubbers of the Perbunan type, i. e., butadiene-acrylonitrile copolymers, since they give products which show high swelling and low extractability characteristics. One of the chief advantages of these plasticizers is that they are vulcanizable, i. e., they undergo vulcanization along with the rubber and become thoroughly incorporated in the vulcanizate. In this respect they differ from many of the commercial plasticizers which are not vulcanizable and therefore remain as unconverted materials in the finished product. They have been found to be more effective in their plasticizing action than many of the commercial softeners, a smaller quantity being required to give a product with the same compounded Mooney value as is obtained with a much larger quantity of a commercial softener. These softeners can be incorporated into the rubber on a mill, in a Banbury mixer, etc., or if preferred, they can be added to the latex. They can be added to the rubber before, during or after addition of other compounding ingredients. The liquid polybutadiene and liquid polyisoprene which are employed as vulcanizable plasticizers in the practice of my invention are not rubber-like synthetic polymers, but are non-rubber-like liquid polymers free from solid polymers. The molecular weight of these compounds is usually within the limits of 800 to 3000 when determined in a solvent, and they usually have a viscosity of 100 to 5000 Saybolt Furol seconds at 100° F. Unsaturation can be determined by the iodine monochloride method of Kolthoff (Lee, Kolthoff, and Mairs, J. Polymer Science 3, No. 1, 66 (1948)), if desired. As an indication of the unsaturation of these polymers, a determination made on a liquid polybutadiene sample of molecular weight 2000, determined in a solvent, showed an unsaturation of 0.79 double bond per butadiene unit which is equivalent to an iodine number of 371.

The liquid vulcanizable plasticizers used in the practice of my invention are prepared by a mass polymerization process, that is, polymerization with or without an inert reaction medium and catalyzed by a finely divided alkali metal and/or alkali metal hydride, such as sodium, potassium, lithium, sodium hydride, potassium hydride, lithium hydride, and the like. Polymers thus prepared contain no modifier or viscosity controlling agent and they are also free from materials which would act as inhibitors such as antioxidants and shortstops. Finely divided catalyst is used, preferably with a particle size below 200 microns, more preferably below 100 microns in the range of 40 to 80 microns. The amount of catalyst employed usually does not exceed 2 parts by weight of the total monomer charged, preferably in the range 0.5 to 1.5 parts by weight per 100 parts monomer. When mass polymerization methods are employed, liquid products are readily obtained by controlling the temperature, pressure, amount of catalyst, kind and amount of solvent, and the like, with no additional materials being necessary to control the viscosity.

The polymerization is usually carried out in the presence of a solvent, such as paraffinic hydrocarbons, especially the light normally liquid paraffins such as pentanes, hexanes, heptanes; certain naphtha fractions, preferably having not over 10 carbon atoms per molecule; cycloparaffins such as cyclohexane; aromatic hydrocarbons such as benzene, toluene, other lower alkylbenzenes; and the like. The preferred temperature for carrying out the polymerization lies in the range from 60 to 110° C. However, a narrower temperature range of from 85 to 100° C. is most frequently chosen. A more complete description of the process of making these vulcanizable plasticizers which are used in practicing my invention can be found in my copending application, Serial No. 67,098, filed December 23, 1948, of which this application is a continuation-in-part.

The amount of liquid vulcanizable plasticizer employed will vary depending upon the type of polymer being processed and the properties desired in the finished product. It will usually be in the range from 3 to 25 parts by weight per 100 parts by weight elastomer, the larger amounts being used for high Mooney viscosity materials.

Vulcanizable organic elastomer compositions usually contain fillers; modifiers; softeners, tackifiers, and plasticizing substances; vulcanizing agents; age resistors or antioxidants; and accelerators of vulcanization. The exact composition of the vulcanizable organic elastomer composition depends upon the use to which the vulcanizable composition is to be put. The new softeners, plasticizers or tackifiers of my invention can be used in all of the commonly used compounding recipes.

Carbon black is added to many vulcanizable organic elastomer mixes during compounding as a filler. There are many types of carbon blacks used today in compounding, among which are: recently developed high pH furnace carbon blacks having a pH of from 8.0 to 10.5, usually 8.6 to 10.1, such as high abrasion furnace carbon blacks (HAF blacks), super abrasion furnace blacks (SAF blacks) and high modulus furnace carbon blacks (HMF blacks); reinforcing furnace blacks (RF blacks) and very fine furnace blacks (VFF blacks); easy, medium, or hard processing channel blacks; lamp blacks; fine and medium thermal carbon blacks; acetylene carbon blacks; semi-reinforcing furnace carbon blacks; conductive furnace and conductive channel carbon blacks; and high elongative furnace carbon blacks. Other pigments or additives, such as ferric oxide, magnesium carbonate, titanium dioxide, zinc oxide, hydrated alumina, kieselguhr, slate dust, zinc peroxide, zinc chloride, lead peroxide, lead oxide, chlorinated paraffins, glue, barytes, fossil flour, lithopone, various clays, finely divided silica, whiting, etc., can be added as fillers or to modify the properties of the vulcanizable composition or vulcanized composition, such properties as the rate of cure, resistance to scorching during processing, activation of acceleration, etc.

Other softeners, tackifiers and plasticizing substances can be used in conjunction with the softeners, tackifiers and plasticizing materials of this invention, if desired. There are many such substances, among which are vegetable oils, such as palm oil, rape oil, olive oil, linseed oil, castor bean oil, soya bean oil, tung oil; bitumens including so-called mineral rubbers, which comprise natural products, such as gilsonite, rafaelite, and also high-boiling petroleum residues, asphalts, etc.; pine tar; paraffin wax; mineral oils; fatty acids, such as oleic acid, stearic acid, palmitic acid, lauric acid, etc.; ceresin; naphthalenes; rosin; wool grease; carnauba wax; the many organic chemical compounds, such as glycerol, glyceryl monostearate, glyceryl monooleate, glyceryl monoricinoleate, trioctyl phosphate, triglycol dioctoate, ethylene glycol monostearate and the monooleate, phenol-formaldehyde thermosetting resins, poly-alpha-methyl styrene, and other polymers of styrene and substituted styrene, dioctyl phthalate, dioctyl sebacate, polybutenes, zinc resinate, coumarone resins, dihydroabietic acid, etc. Most of these compounds aid tackiness as well as soften or plasticize the vulcanizable organic elastomers. Also, some of them exhibit modifying characteristics.

Vulcanizing agents are added to vulcanize the organic elastomers during the vulcanization step of processing. There are a wide variety of vulcanizing agents, such as: sulfur, including powdered sulfur, or in one or more other forms, and mixtures thereof; so-called plastic sulfurs; sulfur-containing compounds, such as sulfur chloride, hydrogen sulfide, sulfur thiocyanate, tetraalkylthiuram disulfides, etc.; selenium; tellurium; benzoyl peroxide; trinitrobenzene; dinitrobenzene; nitrobenzene; quinones; certain inorganic oxidizing agents; diazoaminobenzene and its derivatives; other nitrogen-containing compounds, etc.

Accelerators of vulcanization are added to accelerate vulcanization during the vulcanization step of processing. There are many well known accelerators of vulcanization, such as: thioureas; thiophenols; mercaptans; dithiocarbamates; xanthates; trithiocarbamates; dithio acids, mercaptothiazoles; mercaptobenzothiazoles; thiuram sulfides; organic-cobalt chelates; etc., and various mixtures thereof. Some widely used and particularly good accelerators are, for instance, mercaptobenzothiazole, benzothiazyl disulfide, diphenylguanidine, zinc salt of mercaptobenzothiazole, zinc benzothiazyl sulfide, tetramethylthiuram disulfide, N-cyclohexyl-2-benzothiazole sulfenamide, aldehyde - ammonias, triphenylguanidine, zinc dibutyl and zinc dimethyl dithiocarbamate, many others, and mixtures thereof.

In most cases it is the usual practice to add age resistors or antioxidants to vulcanizable organic elastomer mixes during the mixing step of processing in order to slow down or prevent the deterioration of the vulcanized product. Antioxidants or age resistors have the property of maintaining tensile strength, resistance to abrasion, elasticity, preventing flex cracking, etc. One or more antioxidants are usually employed, such as phenyl-beta-naphthylamine, p-aminophenol, hydroquinone, p-hydroxydiphenyl, diphenylamine, 2,4-toluene diamine, p-ditolylamine, o-ditolyamine, beta-naphthyl-nitrosoamine, N,N'-diphenyl diamine ethane, phenyl-alpha-naphthylamine, p,p'-diamino-diphenylmethane, etc.

The vulcanizable organic elastomer compositions resulting from admixing the various ingredients with the new softeners, plasticizers and tackifiers of my invention by the methods known in the prior art, are vulcanized in the usual manner after they are molded or shaped into the desired shape by the numerous shaping operations of the prior art, such as calendering, casting from solution, continuous or discontinuous extrusion, molding in open or closed molds, etc., and they can be used for the many purposes for which other similar compositions are used. For example, they can be used for tire tubes, tire treads, tire casings, shoe soles and heels, raincoats, table covers, hose for the transmission of fluids, belts, balloon coverings, printers' rolls, printers' blankets, engraving plates, aprons, gloves, masks, tanks, battery cases, friction tape mats, wire insulation, etc. Fabrics can be coated or impregnated by calendering or impregnation with a suitable emulsion.

The following are set forth as examples of my invention. It is to be understood that the quantities, materials, etc., set forth in the following examples, are not to unduly limit the scope of my invention.

*Example I*

A butadiene/styrene elastomer was prepared at 5° C. according to the following recipe:

| | Parts by weight |
|---|---|
| Butadiene | 70.5 |
| Styrene | 29.5 |
| Water | 198.4 |
| Rosin soap, K salt [1] | 4.5 |
| Cumene hydroperoxide | 0.1 |
| Sodium hydroxide | 0.1 |
| Tert.-$C_{12}$ mercaptan | 0.175 |
| Potassium pyrophosphate, $K_4P_2O_7$ | 0.17 |
| Ferrous sulfate, $FeSO_4 \cdot 7H_2O$ | 0.12 |
| Dextrose | 1.0 |
| Trisodium phosphate, $Na_3PO_4 \cdot 12H_2O$ | 0.5 |
| Neutral sodium salt of a condensed aryl sulfonic acid [2] | 0.12 |

[1] Dresinate 214.
[2] Triton R-100.

Polymerization was continued to 60 per cent conversion and the resulting polymer had a raw Mooney value of 50 to 55.

Samples of the polymer prepared as described above were employed in a compounding study using variable quantities of liquid polybutadiene softener (viscosity 377 Saybolt Furol seconds at 100° F.) at different black loadings. Black quantities of 25, 50, 60, and 75 parts by weight per 100 parts rubber were used and the softener quantities were 5, 10, and 15 parts by weight per 100 parts rubber at the low loading of black and 10, 25, and 50 parts by weight per 100 parts rubber at the three higher concentrations of black. For purposes of comparison an asphalt type softener (Asphalt #6) was evaluated at the same levels to serve as a control for the stocks containing the vulcanizable liquid polybutadiene softener. Stocks were compounded according to the following basic recipe and were roll mill mixed:

| | Parts by weight |
|---|---|
| Elastomer | 100 |
| Carbon black [1] | 25, 50, 60, 75 |
| Zinc oxide | 3.0 |
| Stearic acid | 1.0 |
| Sulfur | 1.75 |
| Flexamine [2] | 1.0 |
| Liquid polybutadiene or asphalt softener | 5, 10, 15, 25, 50 |
| Santocure [3] | variable |

[1] Philblack O, a high abrasion furnace carbon black.
[2] A non-toxic powder, sp. gr. 1.10, M. P. 75–90° C., consisting of a physical mixture containing 65 per cent of a complex diarylamine-ketone reaction product and 35 per cent of N,N'-diphenyl-p-phenylene-diamine.
[3] N-cyclohexyl-2-benzothiazole-sulfenamide.

The samples were cured at 307° F. to equal states of cure (20 per cent compression set) and physical tests made. The following results were obtained on unaged specimens:

Physical properties were also determined on samples which were oven aged 24 hours at 212° F. The following results were obtained:

WITH VULCANIZABLE SOFTENER

| Sample No. | 80° F. | | | ΔT, °F. | Percent Resilience | Flex Life, M | Shore Hardness | Abrasion Loss, cc. |
|---|---|---|---|---|---|---|---|---|
| | 300% Modulus, p.s.i. | Tensile, p.s.i. | Percent Elongation | | | | | |
| 1 | 1,165 | 2,725 | 480 | 42.5 | 72.6 | 2.6 | 49.5 | 6.84 |
| 2 | 890 | 2,490 | 500 | 44.6 | 71.3 | 3.3 | 44.8 | 7.46 |
| 3 | 700 | 2,530 | 550 | 46.3 | 71.2 | 4.1 | 42.0 | 7.16 |
| 4 | 2,455 | 3,390 | 395 | 62.9 | 63.0 | 6.0 | 59.0 | 2.26 |
| 5 | 1,440 | 2,940 | 500 | 66.9 | 63.6 | 6.8 | 51.0 | 2.76 |
| 6 | 615 | 1,635 | 555 | | 59.7 | 35.9 | 37.5 | 2.72 |
| 7 | 2,995 | 3,215 | 345 | 60.8 | 61.3 | 5.3 | 65.0 | 1.82 |
| 8 | 1,860 | 2,815 | 420 | 75.4 | 56.2 | 7.2 | 55.0 | 2.54 |
| 9 | 715 | 1,925 | 520 | | 54.5 | 22.3 | 41.5 | 1.47 |
| 10 | | 3,055 | 250 | 92.7 | 51.1 | <0.1 | 74.5 | |
| 11 | 2,570 | 2,750 | 315 | 88.2 | 52.3 | 0.8 | 65.0 | 2.65 |
| 12 | 1,135 | 1,895 | 455 | 120.3 | 49.3 | 7.2 | 50.0 | 2.45 |

WITH ASPHALT SOFTENER

| 13 | 1,240 | 1,990 | 395 | 41.2 | 74.0 | 1.9 | 52.0 | 8.13 |
| 14 | 1,030 | 2,690 | 530 | 44.2 | 72.1 | 2.0 | 51.0 | 9.36 |
| 15 | 960 | 3,000 | 580 | 46.3 | 71.4 | 2.2 | 50.0 | 10.10 |
| 16 | 2,580 | 3,530 | 405 | 64.5 | 62.0 | 4.8 | 65.5 | 3.20 |
| 17 | 1,830 | 2,995 | 475 | 63.7 | 58.6 | 5.3 | 64.0 | 3.80 |
| 18 | 1,135 | 2,730 | 630 | 73.8 | 50.4 | 9.6 | 60.0 | 4.31 |
| 19 | 3,065 | 3,380 | 340 | 73.8 | 57.9 | 8.0 | 70.0 | 2.91 |
| 20 | 2,260 | 2,770 | 385 | 69.5 | 53.8 | 6.7 | 67.0 | 3.15 |
| 21 | 1,465 | 2,500 | 505 | 77.3 | 45.8 | 7.4 | 67.0 | 4.05 |
| 22 | | 3,150 | 235 | 90.3 | 50.5 | 1.1 | 78.0 | 3.58 |
| 23 | 2,900 | 2,940 | 305 | 81.7 | 46.9 | 10.2 | 75.0 | 3.73 |
| 24 | 2,020 | 2,460 | 395 | 82.6 | 41.5 | 6.6 | 71.5 | 3.99 |

WITH VULCANIZABLE SOFTENER

| Sample No. | PHR Black | Black Softener | PHR Santocure | Min. to 20% Compression Set | 80° F. | | | 200° F. | | ΔT, °F. | Percent Resilience | Flex Life, M | Shore Hardness | Abrasion Loss, cc. | Compounded MS 1½ at 212° F. | Extrusion at 250° F. | |
|---|---|---|---|---|---|---|---|---|---|---|---|---|---|---|---|---|---|
| | | | | | 300% Modulus, p.s.i. | Tensile, p.s.i. | Percent Elongation | Tensile, p.s.i. | Percent Elongation | | | | | | | In/Min. | cc./Min. |
| 1 | 25 | 5 | 1.1 | 32 | 560 | 3,085 | 685 | 830 | 325 | 57.3 | 67.5 | 12.5 | 43.0 | 5.87 | 29.0 | 26.8 | 70.6 |
| 2 | 25 | 10 | 1.2 | 32 | 475 | 3,000 | 780 | 780 | 370 | 58.2 | 66.2 | 12.6 | 41.0 | 5.78 | 25.0 | 28.8 | 79.6 |
| 3 | 25 | 15 | 1.35 | 30 | 380 | 2,800 | 800 | 670 | 390 | 60.5 | 65.6 | 12.6 | 38.0 | 4.69 | 20.5 | 33.5 | 84.1 |
| 4 | 50 | 10 | 1.1 | 31 | 1,295 | 3,155 | 650 | 1,695 | 380 | 80.6 | 57.0 | 12.6 | 53.0 | 1.82 | 34.5 | 34.8 | 84.0 |
| 5 | 50 | 25 | 1.4 | 30 | 730 | 2,640 | 665 | 1,440 | 460 | 100.7 | 56.7 | 17.1 | 45.0 | 2.08 | 21.0 | 46.0 | 100.0 |
| 6 | 50 | 50 | 1.6 | 34 | 265 | 1,455 | 800 | 560 | 445 | 150.4 | 55.9 | ²40.1 | 32.0 | 1.71 | 10.0 | 65.0 | 107.0 |
| 7 | 60 | 10 | 1.1 | 29 | 1,700 | 2,940 | 485 | 1,620 | 345 | 88.2 | 54.8 | 5.3 | 58.0 | 1.72 | 40.5 | 43.5 | 87.6 |
| 8 | 60 | 25 | 1.3 | 31 | 925 | 2,345 | 585 | 1,210 | 430 | 115.7 | 53.1 | 8.2 | 48.0 | 1.97 | 25.0 | 48.3 | 95.8 |
| 9 | 60 | 50 | 1.5 | 35 | 290 | 1,415 | 820 | 480 | 450 | 173.4 | 52.0 | 48.7 | 35.5 | 1.26 | 12.0 | 60.0 | 103.0 |
| 10 | 75 | 10 | 1.1 | 27 | 2,160 | 2,685 | 380 | 1,385 | 265 | 124.9 | 45.6 | 1.2 | 65.5 | 2.54 | 54.5 | 51.8 | 85.0 |
| 11 | 75 | 25 | 1.25 | 30 | 1,370 | 2,220 | 490 | 1,190 | 335 | 150.0 | 47.1 | 4.3 | 58.0 | 2.44 | 34.0 | 53.0 | 92.4 |
| 12 | 75 | 50 | 1.5 | 34 | 485 | 1,225 | 655 | 560 | 420 | 186.0 | 48.5 | 13.1 | 43.5 | 1.85 | 16.0 | 62.0 | 100.0 |

WITH ASPHALT SOFTENER

| 13 | 25 | 5 | 1.2 | 30 | 690 | 3,500 | 700 | 1,030 | 405 | 54.1 | 68.4 | 7.8 | 46.0 | 7.10 | 32.0 | 26.0 | 80.0 |
| 14 | 25 | 10 | 1.25 | 30 | 560 | 3,300 | 740 | 850 | 380 | 55.6 | 66.9 | 7.1 | 45.0 | 7.65 | 30.0 | 24.6 | 75.6 |
| 15 | 25 | 15 | 1.3 | 30 | 480 | 3,350 | 780 | 1,025 | 500 | 57.5 | 65.9 | 7.9 | 45.5 | 7.55 | 28.5 | 24.7 | 77.0 |
| 16 | 50 | 10 | 1.1 | 30 | 1,530 | 3,360 | 575 | 2,020 | 450 | 77.1 | 56.9 | 14.8 | 59.0 | 2.17 | 42.0 | 35.0 | 85.0 |
| 17 | 50 | 25 | 1.4 | 28 | 1,090 | 3,200 | 670 | 1,810 | 520 | 77.6 | 53.4 | 17.0 | 56.0 | 2.50 | 34.0 | 37.0 | 88.8 |
| 18 | 50 | 50 | 1.5 | 31 | 630 | 2,535 | 770 | 1,465 | 680 | 114.3 | 46.8 | 33.8 | 54.0 | 2.25 | 25.0 | 41.2 | 93.0 |
| 19 | 60 | 10 | 1.0 | 31 | 1,845 | 3,225 | 510 | 1,895 | 370 | 90.7 | 51.4 | 9.2 | 64.0 | 1.90 | 49.5 | 42.8 | 90.0 |
| 20 | 60 | 25 | 1.3 | 29 | 1,400 | 3,090 | 625 | 1,940 | 475 | 84.4 | 48.9 | 14.2 | 62.0 | 2.02 | 40.0 | 46.5 | 88.4 |
| 21 | 60 | 50 | 1.5 | 31 | 845 | 2,595 | 710 | 1,565 | 595 | 105.9 | 44.2 | 15.7 | 60.0 | 2.00 | 30.0 | 48.6 | 88.5 |
| 22 | 75 | 10 | 1.0 | 31 | 2,445 | 3,005 | 385 | 1,645 | 260 | 107.7 | 46.5 | 1.1 | 70.0 | 2.76 | 62.0 | 53.0 | 83.0 |
| 23 | 75 | 25 | 1.2 | 33 | 1,830 | 2,730 | 475 | 1,810 | 340 | 98.4 | 43.4 | 11.2 | 68.0 | 2.42 | 50.0 | 53.9 | 87.0 |
| 24 | 75 | 50 | 1.5 | 33 | 1,230 | 2,275 | 560 | 1,555 | 435 | 113.8 | 39.9 | 11.9 | 64.0 | 2.25 | 34.0 | 53.7 | 89.8 |

¹ 35 minutes' cure time.
² Percent broken at 50,000 flexures.

The following table shows data on milling and tack:

WITH VULCANIZED SOFTENER

| Sample No. | Watt Hours Power | | Kw. Maximum Power | Tack |
|---|---|---|---|---|
| | Mill | Remill | | |
| 1 | 1,090 | 360 | 5.0 | 3 |
| 2 | 1,050 | 400 | 4.8 | 3 |
| 3 | 980 | 370 | 4.4 | 3 |
| 4 | 1,170 | 440 | 5.8 | 3 |
| 5 | 1,050 | 360 | 4.4 | 4 |
| 6 | 930 | 250 | 5.2 | 5 |
| 7 | 1,270 | 490 | 6.6 | 5 |
| 8 | 1,130 | 370 | 5.8 | 4 |
| 9 | 1,020 | 280 | 3.6 | 4 |
| 10 | 1,430 | 540 | 8.4 | 4 |
| 11 | 1,160 | 390 | 6.0 | 3 |
| 12 | 1,030 | 250 | 5.2 | 5 |

WITH ASPHALT SOFTENER

| 13 | 1,120 | 390 | 6.0 | 1 |
| 14 | 1,240 | 480 | 6.0 | 1 |
| 15 | 1,220 | 390 | 6.0 | 2 |
| 16 | 1,580 | 470 | 7.0 | 3 |
| 17 | 1,570 | 420 | 6.6 | 3 |
| 18 | 1,170 | 390 | 3.9 | 4 |
| 19 | 1,460 | 500 | 7.9 | 3 |
| 20 | 1,560 | 420 | 7.2 | 4 |
| 21 | 1,550 | 390 | 6.8 | 4 |
| 22 | 1,780 | 590 | 9.4 | 3 |
| 23 | 1,630 | 440 | 9.2 | 2 |
| 24 | 1,180 | 390 | 9.2 | 4 |

It is noted that the liquid polybutadiene softener exerted a much more powerful plasticizing action than the asphalt softener as evidenced by the compounded Mooney values. On the basis of compounded Mooney values, 10 and 25 parts (per 100 parts elastomer) of vulcanizable plasticizer was found to be approximately equal to 25 and 50 parts (per 100 parts elastomer) of asphalt softener in plasticizing action. The vulcanizable softener also exerted a much more pronounced effect on the Shore hardness values. Both unaged and aged samples containing polybutadiene showed superior abrasion resistance to the samples containing the asphalt softener; also the aged flex life values for samples containing polybutadiene were superior to those containing equal quantities of asphalt softener at black loadings of 60 parts per 100 parts elastomer and below. If the properties of compounds of equal processability (equal compounded Mooney) at the same black loadings are compared, it can be seen that the stocks softened with vulcanizable plasticizer exhibited higher modulus and better resilience (e. g., compare the following samples: 1 and 15; 4 and 17; 7 and 20; 11 and 24).

*Example II*

Liquid polybutadiene (as in Example I) was employed as a softener for a 135 Mooney butadiene/styrene elastomer prepared by emulsion polymerization at 5° C. in an iron pyrophosphate activated recipe catalyzed by cumene hydroperoxide. The following compounding recipe was used:

| | Parts by weight |
|---|---|
| Butadiene/styrene elastomer, 135 ML-4 | 100 |
| Carbon black [1] | 50 |
| Zinc oxide | 3 |
| Liquid polybutadiene | 20 |
| Sulfur | 1.75 |
| N-cyclohexyl-2-benzothiazolesulfenamide | 0.95 |
| Stearic acid | 2 |

[1] Philblack O, a high abrasion furnace carbon black.

For comparative purposes a control was run using as softener 20 parts by weight of a blend containing equal proportions of two commercial softeners, an asphaltic flux (Paraflux) and a naphthenic base oil (Circo oil, Saybolt Universal viscosity at 100° F. of 150–160 seconds and an API gravity of 20.2–22.5 at 60° F.).

The mixes were milled and cured 30 minutes at 307° F. and the physical properties determined. The following results were obtained:

| | Liquid Polybutadiene | Paraflux-Circo Oil Blend |
|---|---|---|
| Unaged Samples: | | |
| Compounded Mooney, MS 1½ | 35.3 | 43.1 |
| Stress-strain properties at 80° F.— | | |
| 300 percent Modulus, p. s. i | 410 | 520 |
| Tensile, p. s. i | 2,500 | 3,120 |
| Elongation, percent | 680 | 760 |
| Hysteresis, ΔT, ° F | [1] 88.3 | 88.3 |
| Resilience, percent | 63.9 | 65.4 |
| Flex life at 210° F., M | 36.2 | [2] 45.7 |
| Shore hardness | 50.5 | 52.5 |
| Abrasion loss, cc | 2.76 | 3.40 |
| Compression set, percent | 20.7 | 20.4 |
| Extrusion at 250° F., inches/minute | 61.5 | 42 |
| Extrusion at 250° F., cc./minute | 97.8 | 77.6 |
| Tack rating | 7 | 5 |
| Oven Aged 24 Hours at 212° F.: | | |
| Stress-strain properties at 80° F.— | | |
| 300 percent modulus, p. s. i | 1,300 | 1,660 |
| Tensile, p. s. i | 1,630 | 3,600 |
| Elongation, percent | 350 | 510 |
| Hysteresis, ΔT, ° F | [1] 66.5 | [1] 55.0 |
| Resilience, percent | 67.9 | |
| Flex life at 210° F., M | 11.4 | 5.73 |
| Shore hardness | 56 | 61 |
| Abrasion loss | 3.49 | 3.57 |

[1] 45 minute cure.
[2] Percent broken at 50,000 flexures.

The above data show that the liquid polybutadiene was a much more powerful plasticizer than the commercial softener blend and the resulting compounded stock was markedly superior in aged flex life and also more resistant to abrasion than the sample containing the commercial softener blend, and extruded at a more rapid rate.

*Example III*

Liquid polybutadiene (as in Example I) was employed as a softener for a 100 Mooney butadiene/styrene elastomer prepared by emulsion polymerization at 5° C. in a cumene hydroperoxide catalyzed system with iron pyrophosphate as activator. The following compounding recipe was used:

| | Parts by weight |
|---|---|
| Elastomer, 100 ML-4 | 100 |
| Liquid polybutadiene | 9.9 |
| Carbon black [1] | 50 |
| Zinc oxide | 3 |
| Sulfur | 1.75 |
| N-cyclohexyl-2-benzothiazolesulfenamide | 0.95 |
| Stearic acid | 1.0 |

[1] Philblack O, as described hereinbefore.

For comparative purposes a control was run using 10 parts of a commercial asphalt softener (asphalt #6).

The mixes were milled and cured at 307° F. to equal states of cure (17 per cent compression set) and the physical properties determined. The following results were obtained:

|  | Liquid Polybutadiene | Asphalt #6 |
|---|---|---|
| Unaged Samples: |  |  |
| Compounded Mooney, MS 1½ | 52.5 | 64.5 |
| Minutes cure to 17% Compression set | 31 | 29 |
| Stress-strain properties at 80° F.— |  |  |
| 300% modulus, p. s. i | 1,270 | 1,360 |
| Tensile, p. s. i | 3,960 | 4,000 |
| Elongation, percent | 575 | 610 |
| Hysteresis, ΔT, °F | 76.4 | 82.0 |
| Resilience, percent | 66.1 | 62.0 |
| Flex life at 210° F., M | 11.2 | 19.2 |
| Shore hardness | 57.5 | 62.5 |
| Abrasion loss, cc.[1] | 2.78 | 2.20 |
| Extrusion at 250° F., inches/minute | 40.0 | 35.0 |
| Extrusion at 250° F., cc./minute | 76.4 | 67.4 |
| Oven Aged 24 Hours at 212° F.: |  |  |
| Stress-strain properties at 80° F.— |  |  |
| 300% modulus, p. s. i | 2,400 | 2,210 |
| Tensile, p. s. i | 3,500 | 3,840 |
| Elongation, percent | 420 | 425 |
| Hysteresis, ΔT, °F | 58 | 62.6 |
| Resilience, percent | 71.3 | 66.6 |
| Flex life at 210° F., M | 5.8 | 3.0 |
| Shore hardness | 65 | 67 |
| Abrasion loss, cc.[1] | 2.62 | 2.82 |

[1] 35 minute cure.

These data show that the aged samples containing liquid polybutadiene are superior to stocks containing asphalt softener in modulus, heat build-up, resilience, flex life, and abrasion loss. The liquid polybutadiene is also shown to be a much more powerful plasticizer than the asphalt softener.

*Example IV*

A 55 Mooney, ML-4, butadiene/styrene copolymer was prepared by emulsion polymerization at 5° C. in an iron pyrophosphate activated recipe using cumene hydroperoxide as the catalyst. Liquid polybutadiene (as in Example I) was employed as the softener and was added to the latex, 5 and 10 parts, respectively, being used per 100 parts rubber. The compounding recipe was as follows:

| | Parts by weight |
|---|---|
| Butadiene/styrene elastomer | 100 |
| Polybutadiene | 5.10 |
| Carbon black [1] | 50 |
| Zinc oxide | 3 |
| Stearic acid | 1 |
| Sulfur | 1.75 |
| N-cyclohexyl-2-benzothiazolesulfenamide | 0.95 |

[1] Philblack O, as described hereinbefore.

For comparative purposes a control was run using 6 parts of a commercial asphalt softener (asphalt #6) instead of the liquid polybutadiene. The rubber stock was similar to that used above except that the raw Mooney was 54.

The mixes were milled and cured 30 minutes at 307° F. Physical properties were determined and the following results obtained:

|  | Liquid Polybutadiene | | Asphalt #6 |
|---|---|---|---|
|  | 5 Parts | 10 Parts |  |
| Unaged Samples: |  |  |  |
| Compounded Mooney, MS 1½ | 48 | 41 | 55 |
| Stress-strain properties at 80° F.— |  |  |  |
| 300% Modulus, p. s. i | 1,900 | 1,500 | 2,080 |
| Tensile, p. s. i | 3,680 | 3,540 | 3,650 |
| Elongation, percent | 480 | 540 | 480 |
| Stress-strain properties at 200° F.[1]— |  |  |  |
| Tensile, p. s. i | 2,280 | 1,730 | 2,230 |
| Elongation, percent | 300 | 305 | 265 |
| Hysteresis, ΔT, °F | 70 | 71.6 | 71.6 |
| Resilience, percent | 62.4 | 60.5 | 59.7 |
| Flex life at 210° F., M | 7.1 | 4.9 | 8.4 |
| Shore hardness | 62.5 | 59 | 65 |
| Unaged Samples—Continued. |  |  |  |
| Stress-strain properties at 200° F.—Continued. |  |  |  |
| Abrasion loss, grams [2] | 2.38 | 2.79 | 2.86 |
| Compression set, percent | 13.1 | 14.5 | 16.1 |
| Extrusion at 250° F., inches/minute | 40.5 | 41 | 35.5 |
| Extrusion at 250° F., grams/minute | 99.5 | 100.5 | 89.5 |
| Oven Aged 24 Hours at 212° F.: |  |  |  |
| Stress-strain properties at 80° F.— |  |  |  |
| 300% modulus, p. s. i | 3,190 | 2,630 | 3,230 |
| Tensile, p. s. i | 3,800 | 3,460 | 3,600 |
| Elongation, percent | 350 | 370 | 330 |
| Hysteresis, ΔT, °F | 60.8 | 62.5 | 64.8 |
| Resilience, percent | 68.8 | 67.6 | 66.8 |
| Flex life at 210° F., M | 6.4 | 6.2 | 6.0 |
| Shore hardness | 67 | 64 | 69.5 |
| Abrasion loss, grams [2] | 2.53 | 2.82 | 3.31 |

[1] 45 minute cure.
[2] 35 minute cure.

These results again show that liquid polybutadiene is a much more effective plasticizer than the asphalt softener; also, rubber softened with the vulcanized plasticizer shows better hysteresis, flex life, and extrusion properties on the aged samples and more resistance to abrasion both before and after aging.

*Example V*

Liquid polyisoprene (viscosity, Saybolt Furol seconds at 100° F., 1448; sp. gr. 60/60° F., 0.9026; refractive index at 68° F., 1.5128) was employed as the softener in a 50–55 Mooney rubber stock prepared as described in Example I. Compounding was effected according to the following recipe:

| | Parts by weight |
|---|---|
| Butadiene/styrene elastomer | 100 |
| Carbon black [1] | 50 |
| Zinc oxide | 3.0 |
| Polyisoprene | 6.0 |
| Stearic acid | 1.0 |
| Flexamine [1] | 1.0 |
| Sulfur | 1.75 |
| N-cyclohexyl-2-benzothiazolesulfenamide | 1.0 |

[1] As described in Example I.

A control run was made using 6 parts of a commercial asphalt softener (asphalt #6) instead of liquid polyisoprene.

Physical properties were determined after curing the samples at 307° F. for 30 minutes. The results were as follows:

|  | Polyisoprene | Asphalt #6 |
|---|---|---|
| Unaged Samples: |  |  |
| Compounded Mooney, MS 1½ | 38.5 | 44 |
| Stress-strain properties at 80° F.— |  |  |
| 300% Modulus, p. s. i | 1,380 | 1,520 |
| Tensile, p. s. i | 3,360 | 3,590 |
| Elongation, percent | 570 | 585 |
| Hysteresis, ΔT, °F | 85.6 | 78.0 |
| Resilience, percent | 57.4 | 58.3 |
| Flex life at 210° F., M | 13.2 | 16.3 |
| Shore hardness | 58 | 60 |
| Abrasion loss, grams [1] | 1.69 | 1.73 |
| Compression set, percent | 20.7 | 19.6 |
| Extrusion at 250° F., inches/minute | 36.5 | 34.8 |
| Extrusion at 250° F., grams/minute | 98.5 | 94.5 |
| Oven Aged 24 Hours at 212° F.: |  |  |
| Stress-strain properties at 80° F.— |  |  |
| 300% modulus, p. s. i | 2,875 | 2,860 |
| Tensile, p. s. i | 3,480 | 3,380 |
| Elongation, percent | 370 | 375 |
| Hysteresis, ΔT, °F | 61.2 | 64.9 |
| Resilience, percent | 65.2 | 64.8 |
| Flex Life at 210° F., M | 8.5 | 5.5 |
| Shore hardness | 65 | 65 |
| Abrasion loss, grams [1] | 2.35 | 2.74 |

[1] 35 minute cure.

Example VI

Liquid polybutadiene (as in Example I) was compared with the commercial softener, Dutrex 6 (aromatic nucleus with attached unsaturated olefins: odorless, non-toxic, dark, heavy, viscous liquid, sp. gr., 1.03; M. P., 60° F.; B. P. 610° F.) and with a blend containing equal parts of Circosol 2XH (a petroleum hydrocarbon softener, containing hydrocarbons of high molecular weight, in the form of a heavy, viscous, transparent, pale green, odorless liquid of low volatility; sp. gr., 0.940; Saybolt viscosity at 100° F., about 2,000 seconds) and Paraflux (an asphaltic flux). These softeners were employed in a 50–55 ML–4 rubber stock prepared as described in Example I and compounded according to the recipe given in Example V except that in each case 10 parts softener was used. The samples were cured at 307° F. for 45 minutes and the physical properties determined. The results are shown below.

|  | Liquid Polybutadiene | Dutrex | Circosol 2XH-Paraflux Blend |
|---|---|---|---|
| Unaged Samples: |  |  |  |
| Compounded Mooney, MS 1½ | 42.5 | 44 | 47 |
| Stress-strain properties at 80° F.— |  |  |  |
| 300% modulus, p. s. i | 1,250 | 1,410 | 1,380 |
| Tensile, p. s. i | 3,270 | 3,720 | 3,660 |
| Elongation, percent | 565 | 595 | 595 |
| Hysteresis, ΔT, °F | 83.9 | 71.9 | 73.6 |
| Resilience, percent | 61.5 | 64.0 | 63.6 |
| Flex life at 210° F., M | 20.2 | 34.3 | 25.0 |
| Shore hardness | 57 | 58 | 59.5 |
| Compression set, percent | 11.5 | 11.0 | 12.0 |
| Oven Aged 24 Hours at 212° F.: |  |  |  |
| Stress-strain properties at 80° F.[1]— |  |  |  |
| 300% modulus, p. s. i | 2,130 | 2,350 | 2,220 |
| Tensile, p. s. i | 3,760 | 3,670 | 3,630 |
| Elongation, percent | 465 | 430 | ---- |
| Hysteresis, ΔT, °F | 68.3 | 63.5 | 64.9 |
| Resilience, percent | 66.9 | 69.2 | 68.3 |
| Flex life at 210° F., M | 14.5 | 12.0 | 8.9 |
| Shore hardness | 61 | 63 | 64 |

[1] 30 minutes cure time.

The above data show that liquid polybutadiene is a more effective plasticizer than the commercial products employed and the aged sample is superior in flex life.

The liquid polybutadiene and polyisoprene used in the examples was prepared by mass polymerization methods as set forth hereinbefore.

As will be evident to those skilled in the art, various modifications of this invention can be made, or followed, in the light of the foregoing disclosure and discussion, without departing from the spirit of the disclosure or from the scope of the claims.

I claim:

1. The vulcanizable composition of claim 8 wherein said liquid polymer is a polymer of 1,3-butadiene.
2. The vulcanizable composition of claim 8 wherein said liquid polymer is a polymer of 2-methyl-1,3-butadiene.
3. The composition of claim 8 wherein said vulcanizable elastomer is a copolymer prepared by copolymerization of butadiene and styrene monomers in an emulsion system at a temperature of from −20 to 15° C., said butadiene being present in an amount of from 50 to 85 weight per cent of the total weight of said monomers, and said liquid polymer has a Saybolt Furol viscosity of 100 to 5000 seconds at 100° F. and is present in an amount of from 3 to 25 parts by weight per 100 parts by weight of said vulcanizable elastomer.
4. The composition of claim 3 wherein said liquid polymer is a polymer of 1,3-butadiene.
5. The composition of claim 8 wherein said vulcanizable elastomer is natural rubber, and said liquid polymer is present in an amount of from 3 to 25 parts by weight per 100 parts by weight of said natural rubber.
6. The process of claim 9 wherein said liquid polymer is a polymer of 1,3-butadiene having a Saybolt Furol viscosity of 100 to 5000 seconds at 100° F. and is added in an amount of from 3 to 25 parts by weight per 100 parts by weight of said vulcanizable elastomer.
7. The process of claim 9 wherein said liquid polymer is a polymer of 2-methyl-1,3-butadiene having a Saybolt Furol viscosity of 100 to 5000 seconds at 100° F. and is added in an amount of from 3 to 25 parts by weight per 100 parts by weight of said vulcanizable elastomer.
8. A rubber-like, sulfur vulcanizable composition comprising a rubber-like vulcanizable organic elastomer selected from the group consisting of natural rubber and synthetic polymers of conjugated diolefins; and a liquid polymer prepared from monomers consisting of a 1,3-butadiene selected from the group consisting of 1,3-butadiene and 2-methyl-1,3-butadiene, said liquid polymer being prepared by mass polymerization in the presence of a catalyst selected from the group consisting of alkali metals and alkali metal hydrides in an amount not exceeding two parts by weight of the total monomers charged and having a particle size less than 200 microns at a temperature in the range from 60 to 110° C.
9. In the process of processing a rubber-like, sulfur vulcanizable organic elastomer selected from the group consisting of natural rubber and synthetic polymers of conjugated diolefins to produce elastomer products; that improvement which comprises, adding to said rubber-like vulcanizable organic elastomer as a plasticizer a liquid polymer prepared from monomers consisting of 1,3-butadiene selected from the group consisting of 1,3-butadiene and 2-methyl-1,3-butadiene, said liquid polymer being prepared by mass polymerization in the presence of a catalyst selected from the group consisting of alkali metals and alkali metal hydrides in an amount not exceeding two parts by weight of the total monomers charged and having a particle size less than 200 microns at a temperature in the range from 60 to 110° C.
10. The composition of claim 8 in which the molecular weight of said liquid polymer is between the limits of 800 and 3000 as determined in a solvent.
11. The process of claim 9 in which said liquid polymer has a molecular weight between the limits of 800 and 3000 as determined in a solvent.

WILLIE W. CROUCH.

References Cited in the file of this patent

UNITED STATES PATENTS

| Number | Name | Date |
|---|---|---|
| 2,521,361 | Gessler | Sept. 5, 1950 |

FOREIGN PATENTS

| Number | Country | Date |
|---|---|---|
| 492,998 | Great Britain | Sept. 30, 1938 |